(12) United States Patent
Galitsky et al.

(10) Patent No.: US 10,796,099 B2
(45) Date of Patent: Oct. 6, 2020

(54) ENABLING AUTONOMOUS AGENTS TO DISCRIMINATE BETWEEN QUESTIONS AND REQUESTS

(71) Applicant: Oracle International Corporation, Redwood Shores, CA (US)

(72) Inventors: Boris Galitsky, San Jose, CA (US); Vishal Vishnoi, Redwood City, CA (US); Anfernee Xu, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/145,702

(22) Filed: Sep. 28, 2018

(65) Prior Publication Data

US 2019/0095425 A1    Mar. 28, 2019

Related U.S. Application Data

(60) Provisional application No. 62/564,868, filed on Sep. 28, 2017.

(51) Int. Cl.
*G06F 40/30* (2020.01)
*G10L 15/18* (2013.01)
*G06F 40/205* (2020.01)
*G06F 40/253* (2020.01)
*G06F 40/295* (2020.01)

(52) U.S. Cl.
CPC ............ *G06F 40/30* (2020.01); *G06F 40/205* (2020.01); *G06F 40/253* (2020.01); *G06F 40/295* (2020.01); *G10L 15/18* (2013.01)

(58) Field of Classification Search
CPC ............. G06F 17/2785; G06F 17/2705; G06F 17/274; G06F 40/30; G06F 40/205; G06F 40/253; G06F 40/295; G10L 15/08; G10L 15/088; G10L 15/26; G10L 15/18
See application file for complete search history.

(56) References Cited

U.S. PATENT DOCUMENTS

| | | |
|---|---|---|
| 5,495,605 A | 2/1996 | Cadot |
| 6,112,168 A | 8/2000 | Corston et al. |
| 6,731,307 B1 | 5/2004 | Strubbe et al. |

(Continued)

OTHER PUBLICATIONS

Collins et al., "New Ranking Algorithms for Parsing and Tagging: Kernels over Discrete Structures, and the Voted Perceptron," Proceedings of the 40th Annual Meeting of the Association for Computational Linguistics (ACL), Philadelphia, Jul. 2002, pp. 263-270 (Year: 2002).*

(Continued)

*Primary Examiner* — Michelle M Koeth
(74) *Attorney, Agent, or Firm* — Kilpatrick Townsend & Stockton LLP

(57) ABSTRACT

Systems, devices, and methods of the present invention relate to text classification. A text classification system accesses an utterance of text. The utterance includes at least one word. The text classification system generates a parse tree for the utterance. The parse tree includes at least one terminal node with a word type. The terminal node represents a word of the utterance. The text classification system applies one or more rules to the text. The text classification system then classifies the utterance as a question or a request for an autonomous agent to perform an action.

18 Claims, 9 Drawing Sheets

(56) References Cited

U.S. PATENT DOCUMENTS

| | | | |
|---|---|---|---|
| 7,152,031 | B1 | 12/2006 | Jensen et al. |
| 7,519,529 | B1 | 4/2009 | Horvitz |
| 7,840,556 | B1 | 11/2010 | Dayal et al. |
| 9,292,490 | B2 | 3/2016 | Kimelfeld et al. |
| 9,559,993 | B2 | 1/2017 | Palakovich et al. |
| 9,582,501 | B1 | 2/2017 | Salmon et al. |
| 10,019,716 | B1 * | 7/2018 | Ainslie ............... G06Q 30/016 |
| 10,599,885 | B2 | 3/2020 | Galitsky |
| 10,679,011 | B2 | 6/2020 | Galitsky |
| 2001/0007987 | A1 | 7/2001 | Igata |
| 2002/0040292 | A1 | 4/2002 | Marcu |
| 2002/0046018 | A1 | 4/2002 | Marcu et al. |
| 2003/0138758 | A1 | 7/2003 | Burstein et al. |
| 2004/0044519 | A1 | 3/2004 | Polanyi et al. |
| 2004/0148170 | A1 | 7/2004 | Acero et al. |
| 2005/0086592 | A1 | 4/2005 | Polanyi et al. |
| 2007/0073533 | A1 | 3/2007 | Thione et al. |
| 2007/0136284 | A1 | 6/2007 | Cobb et al. |
| 2007/0192306 | A1 | 8/2007 | Papakonstantinou et al. |
| 2007/0294229 | A1 | 12/2007 | Au |
| 2008/0228467 | A1 | 9/2008 | Womack et al. |
| 2009/0100053 | A1 | 4/2009 | Boschee et al. |
| 2009/0248399 | A1 | 10/2009 | Au |
| 2010/0169359 | A1 | 7/2010 | Barrett et al. |
| 2011/0119049 | A1 | 5/2011 | Ylonen |
| 2011/0153673 | A1 | 6/2011 | Boschee et al. |
| 2013/0046757 | A1 | 2/2013 | Salvetti et al. |
| 2013/0204611 | A1 | 8/2013 | Tsuchida et al. |
| 2014/0040288 | A1 | 2/2014 | Galitsky |
| 2014/0122083 | A1 | 5/2014 | Xiaojiang |
| 2014/0136188 | A1 | 5/2014 | Wroczynski et al. |
| 2015/0039295 | A1 | 2/2015 | Soschen |
| 2015/0046492 | A1 | 2/2015 | Balachandran |
| 2015/0149461 | A1 | 5/2015 | Aguilar Lemarroy et al. |
| 2015/0161512 | A1 | 6/2015 | Byron et al. |
| 2016/0034457 | A1 | 2/2016 | Bradley et al. |
| 2016/0055240 | A1 * | 2/2016 | Tur ........................ G10L 15/22 707/706 |
| 2016/0085743 | A1 | 3/2016 | Haley |
| 2016/0086601 | A1 | 3/2016 | Chotimongkol et al. |
| 2016/0232152 | A1 | 8/2016 | Mahamood |
| 2016/0245779 | A1 | 8/2016 | Khalaj Amineh et al. |
| 2016/0246779 | A1 | 8/2016 | Ho et al. |
| 2016/0247068 | A1 | 8/2016 | Lin |
| 2017/0032053 | A1 | 2/2017 | Letourneau |
| 2017/0116982 | A1 | 4/2017 | Gelfenbeyn et al. |
| 2017/0228368 | A1 | 8/2017 | Carter et al. |
| 2017/0286390 | A1 * | 10/2017 | Yashpe ................. G06F 40/253 |
| 2018/0181648 | A1 | 6/2018 | Chen |
| 2018/0189385 | A1 | 7/2018 | Sun et al. |
| 2018/0314689 | A1 | 11/2018 | Wang et al. |
| 2018/0365228 | A1 | 12/2018 | Galitsky |

OTHER PUBLICATIONS

Artooras et al., "Stanford NLP—VP vs NP," Stack Overflow Website, Mar. 8-9, 2016 (available at: https://stackoverflow.com/questions/35872324/stanford-nlp-vp-vs-np/35887762, last accessed Jan. 30, 2020) (Year: 2016).*

Kittredge et al., An Advanced English Grammar with Exercises, The Athenaeum Press, 1913 (Year: 1913).*

Chen, "Understanding Mental States in Natural Language," Proceedings of the 8th International Conference on Computational Semantics, Tilburg, Jan. 2009, pp. 61-72. (Year: 2009).*

Ebrahim, "NLP Tutorial Using Python NLTK (Simple Examples)," DZone.com, Sep. 24, 2017, accessable at: https://dzone.com/articles/nlp-tutorial-using-python-nltk-simple-examples (last accessed Feb. 1, 2019). (Year: 2017).*

Ponti, "Machine Learning Techniques Applied to Dependency Parsing," University of Pavia, Oct. 2015, accessable at: https://vision.unipv.it/AI/AIRG/MachineLearningTechniquesAppliedToDependencyParsingRevised.pdf (last accessed Jan. 1, 2019). (Year: 2015).*

Galitsky, "Machine learning of syntactic parse trees for search and classification of text," Engineering Applications of Artificial Intelligence, pp. 1072-1091, 2013 (Year: 2013).*

Collins et al., "New Ranking Algorithms for Parsing and Tagging: Kernels over Discreet Structures, and the Voted Perceptron," Proceedings of the 40th Annual Meeting of the Association for Computational Linguistics (ACL), Philadelphia, Jul. 2002, pp. 263-270 (Year: 2002).*

Hara et al., "Exploring Difficulties in Parsing Imperatives and Questions," In Proceedings of 5th International Joint Conference on Natural Language Processing, Nov. 2011, pp. 749-757 (Year: 2011).*

Apache Lucene, "Welcome to Apache Lucene", retrieved from www.lucene.apache.org, Sep. 24, 2018, 44 pages.

Salton, et al., On the Specification of Term Values in Automatic Indexing, Jun. 1973, revised Jul. 1973, Journal of Documentation, pp. 1-35.

Trstenjak, et al., "KNN with TF-IDF Based Framework for Text Categorization", Procedia Engineering, 69 (2014) 1356-1364, $24^{th}$ DAAAM International Symposium on Intelligent Manufacturing and Automation, 2013.

De Mori et al., "Spoken Language Understanding", IEEE Signal Processing Magazine, vol. 25, No. 3, May 2008, pp. 50-58.

Finn, "A Question Writing Algorithm", Journal of Reading Behavior, VII, vol. 4, 1975, pp. 341-367.

"International Search Report and Written Opinion" issued in PCT/US2018/053392, dated Dec. 17, 2018, 11 pages.

Galitsky, "Discovering Rhetorical Agreement between a Request and Response", Dialogue & Discourse, vol. 8, No. 2, Dec. 1, 2017, pp. 167-205.

Galitsky et al., "On a Chat Bot Finding Answers with Optimal Rhetoric Representation", RANLP—Recent Advances in Natural Language Processing Meet Deep Learning, Nov. 10, 2017, pp. 253-259.

International Application No. PCT/US2019/015696, "International Search Report and Written Opinion", dated Apr. 23, 2019, 12 pages.

International Application No. PCT/US2019/031580, "International Search Report and Written Opinion", dated Jul. 5, 2019, 12 pages.

Radev, "A Common Theory of Information Fusion from Multiple Text Sources Step One: Cross-document Structure", In Proceedings of the 1st SIGdial workshop on Discourse and dialogue, SIGDIAL, vol. 10, 2000, pp. 74-83.

Traum, "Rhetorical Relations, Action and Intentionality in Conversation", Proceedings ACL SIG Workshop on Intentionality and Structure in Discourse Relations, Jun. 1993, pp. 132-135.

"Exploring Dialog Management for Bots", Chatbots Magazine, Available online at: https://chatbotsmagazine.com/exploring-dialog-management-for-bots-cbb8665a2fd3, Jul. 11, 2016, 7 pages.

U.S. Appl. No. 15/975,683, "Non-Final Office Action", dated Oct. 31, 2019, 27 pages.

U.S. Appl. No. 15/975,685, "Non-Final Office Action", dated Nov. 15, 2019, 23 pages.

U.S. Appl. No. 16/010,091, "Non-Final Office Action", dated Nov. 18, 2019, 26 pages.

U.S. Appl. No. 16/010,156, "Notice of Allowance", dated Nov. 7, 2019, 13 pages.

Galitsky et al., "Chatbot with a Discourse Structure-Driven Dialogue Management", Proceedings of the Software Demonstrations of the 15th Conference of the European Chapter of the Association for Computational Linguistics Available online at: https://pdfs.semanticscholar.org/439f/cbe14dbc84b694bae2ee42a914d743126d12.pdf, Apr. 2017, pp. 87-90.

Galitsky , "Learning Noisy Discourse Trees", Computational Linguistics and Intellectual Technologies, Proceedings of the International Conference "Dialogue 2017". Available online at: http://www.dialog-21.ru/media/3911/galitskyb.pdf, May 31-Jun. 3, 2017, 14 pages.

Galitsky et al., "Style and Genre Classification by Means of Deep Textual Parsing", Computational Linguistics and Intellectual Technologies: Proceedings of the International Conference "Dialogue 2016", Jun. 2016, pp. 1-45.

(56) References Cited

OTHER PUBLICATIONS

Marcu et al., "An Unsupervised Approach to Recognizing Discourse Relations", Proceedings of the 40th Annual Meeting of the Association for Computational Linguistics (ACL), 2002, pp. 368-375.
PCT/US2018/031890 , "International Preliminary Report on Patentability", dated Nov. 21, 2019, 9 pages.
Sjoera , "The Linguistics Behind Chat Bots", iCapps, Available online at: http://www.icapps.com/the-linguistics-behind-chatbots/, Feb. 22, 2017, 9 pages.
Tai et al., "Improved Semantic Representations from Tree-Structured Long Short-Term Memory Networks", Available Online at: https://arxiv.org/pdf/1503.00075.pdf, May 30, 2015, pp. 1-11.
Wang et al., "Using Learning Analytics to Understand the Design of an Intelligent Language Tutor-Chatbot Lucy", International Journal of Advanced Computer Science and Applications, vol. 4, No. 11, Nov. 2013, pp. 124-131.
U.S. Appl. No. 15/975,683, "Non-Final Office Action", dated Mar. 19, 2020, 16 pages.
U.S. Appl. No. 15/975,685, "Non-Final Office Action", dated Apr. 1, 2020, 23 pages.
U.S. Appl. No. 16/010,091, "Notice of Allowance", dated Mar. 19, 2020, 13 pages.
U.S. Appl. No. 16/010,141, "Non-Final Office Action", dated Feb. 24, 2020, 12 pages.
U.S. Appl. No. 16/145,777, "Non-Final Office Action", dated Apr. 3, 2020, 18 pages.
Galitsky et al., "Finding Maximal Common Sub-Parse Thickets for Multi-Sentence Search", Graph Structures for Knowledge Representation and Reasoning, 2014, 19 pages.
Galitsky et al., "Text Classification Based on Deep Textual Parsing", Available Online at: http://ceur-ws.org/Vol-1886/paper_8.pdf, 2011, pp. 1-9.
Johnson et al., "The FrameNet Tagset for Frame-Semantic and Syntactic Coding of Predicate-Argument Structure", Proceedings of the 1st North American Chapter of the Association for Computational Linguistics Conference, Apr. 2000, pp. 56-62.
International Application No. PCT/US2018/053392, "International Preliminary Report on Patentability", dated Apr. 9, 2020, 7 pages.
U.S. Appl. No. 15/975,683 , Notice of Allowance, dated Jun. 12, 2020, 17 pages.
U.S. Appl. No. 15/975,685 , Notice of Allowance, dated Jul. 24, 2020, 17 pages.
U.S. Appl. No. 16/010,141 , Final Office Action, dated Jul. 30, 2020, 14 pages.
U.S. Appl. No. 16/145,777 , Notice of Allowance, dated Jul. 15, 2020, 17 pages.
U.S. Appl. No. 16/260,939 , Notice of Allowance, dated Jun. 12, 2020, 14 pages.

\* cited by examiner

US 10,796,099 B2

ENABLING AUTONOMOUS AGENTS TO DISCRIMINATE BETWEEN QUESTIONS AND REQUESTS

CROSS-REFERENCES TO RELATED APPLICATIONS

This application claims the benefit of U.S. Provisional Application No. 62/564,868, filed Sep. 28, 2017, which is incorporated by reference in its entirety.

TECHNICAL FIELD

This disclosure is generally concerned with linguistics. More specifically, this disclosure relates to using linguistics to classify an utterance as a question or a request for the autonomous agent to perform an action.

STATEMENT AS TO RIGHTS TO INVENTIONS MADE UNDER FEDERALLY SPONSORED RESEARCH AND DEVELOPMENT

NOT APPLICABLE

BACKGROUND

Autonomous agents can be used to address a variety of user questions. For example, an autonomous agent receives a request for information from a user such as "what are the fees associated with a checking account." Subsequently, a user may ask "please open a new bank account for me."

But current solutions are unable to distinguish between user utterances that relate to a question and utterances that are a request for an action to be performed. This is the case in part because requests can be implicit, e.g., "I am too cold" rather than explicit, e.g., "please turn on the heat." Existing solutions may erroneously classify "I am too cold" as a question relating to "coldness," and provide an answer such as "in San Francisco, the temperature can sometimes be cold."

Accordingly existing solutions can cause user frustration. Continuing the above example, the user may become frustrated because his desire that the autonomous agent turn on the heat is ignored. The consequences for mistaking these two types of utterances can be high. For example, if the agent misinterprets a user's question, the user may reformulate the question, but if the agent still fails to recognize the question, the user may be confused as to how to continue or simply give up using the agent entirely, rendering the agent far less useful. User frustration can in turn cause low rates of adoption of autonomous agents.

As such, solutions are needed for discriminating between questions and requests.

BRIEF SUMMARY

Generally, systems, devices, and methods of the present invention are related to text classification. In an aspect, a system includes a linguistic engine and a rule engine. The linguistic engine is configured to access an utterance including at least one word. The linguistic engine is further configured to generate a parse tree for the utterance. The parse tree includes at least one non-terminal node including a word type and at least one terminal node including a type. Each terminal node represents a word or phrase of the utterance. The linguistic engine is further configured to apply, to the parse tree, one or more linguistic templates including one or more word types. The rule engine is configured to generate one or more match results obtained from the linguistic engine and determine a classification of the text by applying rules. The rules include responsive to determining a linguistic template match, classifying the utterance as a request. The rules further include responsive to determining that the utterance includes an imperative verb as a first word of the utterance, classifying the utterance as a request. The rules further include responsive to identifying one or more predefined request keywords in the utterance, classifying the utterance as a request. The rules further include responsive to identifying one or more predefined question keywords in the utterance, classifying the utterance as a question. The system is further configured, based on the classification, to send a message to a user device or adjust a configuration of an external device.

In an aspect, the rules further include classifying the utterance as unknown responsive to failing to identify the utterance as a question or a request.

In an aspect, the linguistic template includes a first-person pronoun and a noun.

In an aspect, the rules further include classifying the utterance as a question responsive to determining that the utterance includes a question prefix in a first word position.

In an aspect, the one or more predefined question words include mental verbs.

In an aspect, the rules further include classifying the utterance as a request responsive to determining that the utterance includes a request suffix at in a last word position of the utterance.

In an aspect, the rules further include classifying the utterance as a request responsive to determining that the utterance includes transaction verb.

In an aspect, the linguistic engine is configured to, prior to determining the parse tree, removing one or more stop words from the utterance.

In an aspect, a method of using a classification model to classify utterances as questions or requests accesses an utterance of text. The utterance includes at least one word. The method generates a parse tree for the utterance. The parse tree includes at least one non-terminal node including a word type and at least one terminal node including a type. Each terminal node represents a word or phrase of the utterance. The method determines a classification of the utterance by applying a classification model to the parse tree. Determining the classification of the utterance includes determining, for the parse tree, a first similarity score indicating a first match between the utterance and training classes identified as utterances. Determining the classification of the utterance includes determining, for the parse tree, a second similarity score indicating a second match between the utterance and training classes identified as requests. The method includes receiving a classification of the utterance from the classification model. The classification is based on a similarity score for the determined class being higher than other similarity scores or is unknown.

In an aspect, the method accesses a set of training data including a set of training data pairs. Each training data pair includes text and an expected classification. The set of training data includes both a first training data pair that includes a question and a second training data pair includes a request. The method trains a classification model by iteratively providing one of the training data pairs to the classification model, receiving a determined classification from the classification model, calculating a loss function by calculating a difference between the determined classification and the expected classification, and adjusting internal parameters of the classification model to minimize the loss function.

In an aspect, the classification is a classification that includes the highest similarity to the utterance.

The above methods can be implemented on tangible computer-readable media and/or operating within a computer processor and attached memory.

DETAILED DESCRIPTION

Figure 1:
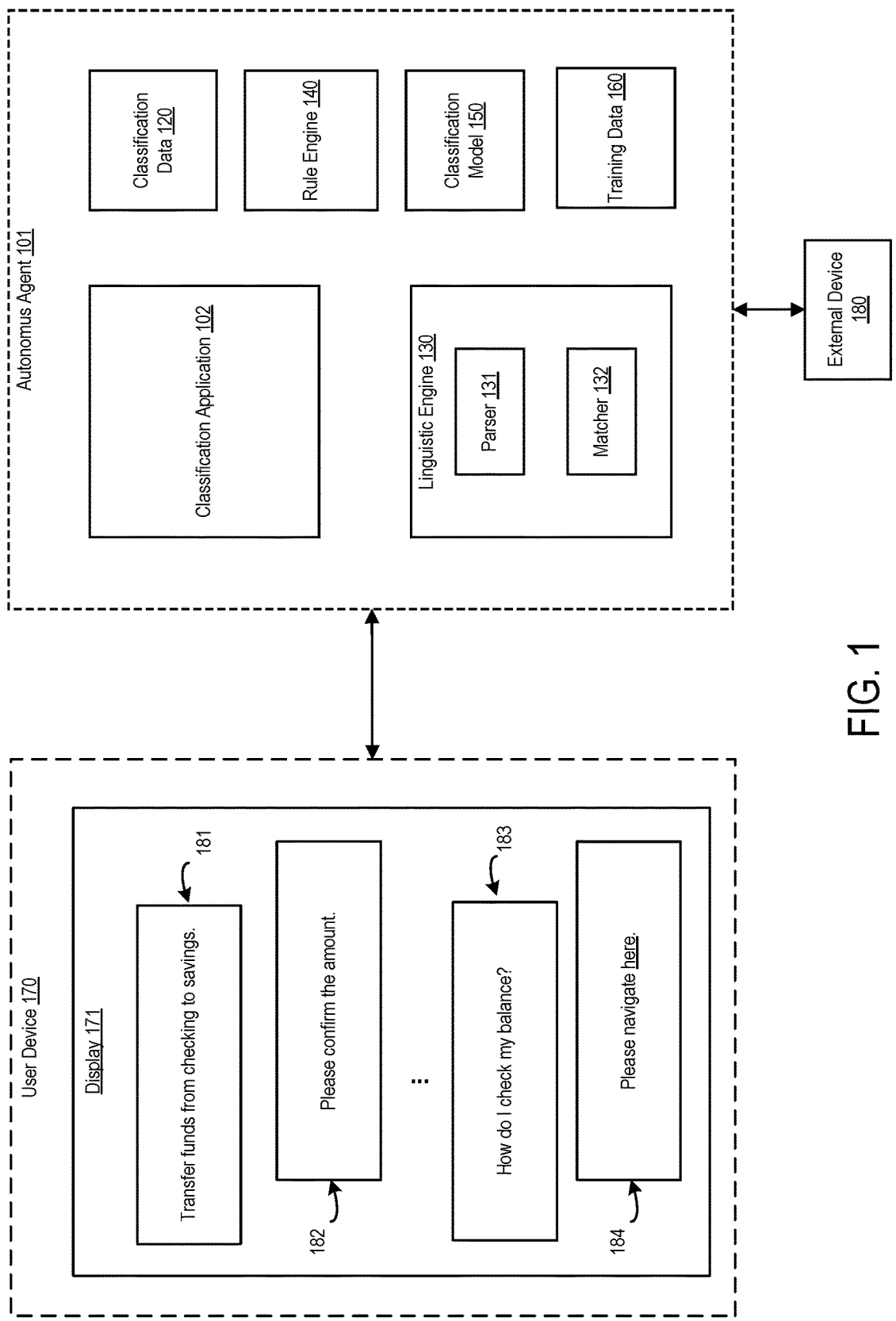
FIG. 1 shows example of a text classification environment in accordance with an aspect.

Aspects disclosed herein provide technical improvements to the area of computer-implemented linguistics by providing improved classification of text. More specifically, certain aspects use linguistics to determine whether text is a question or a request for an action to be performed. As discussed above, existing solutions for autonomous agents are unable to discriminate between a question and a transactional request, leading to a failed interaction between agent and user.

A conversation between two humans is a form of discourse. A conversation between a first human and a second human can be via electronic messages (e.g., chat) addition to more traditional means such as email and voice conversations. An autonomous agent, ChatBot, Autonomous Digital Assistant, or virtual assistant, is an "intelligent" machine that, can replace the second human and, to various degrees, mimic a conversation between two humans. One goal of such systems is that that the first human cannot tell that the second human is a machine (the Turning test, developed by Alan Turing in 1950).

For example, users can interact with an autonomous agent by a conversational interaction. This interaction, also called the conversational user interface, is a dialog between the end user and the agent, just as between two human beings. It could be as simple as the end user saying "Hello" to the agent and the agent responding with a "Hi" and asking the user how it can help, or it could be a transactional interaction in a banking agent, such as transferring money from one account to the other, or an informational interaction in a HR agent, such as checking for vacation balance, or asking an FAQ in a retail agent, such as how to handle returns.

Natural language processing (NLP) and machine learning (ML) algorithms combined with other approaches can be used to classify end user intent. An intent at a high level is what the end user would like to accomplish (e.g., get account balance, make a purchase). An intent can be a mapping of customer input to a unit of work that the backend should perform. Intent can also be a class of utterances leading to a specific agent action (e.g., a request). Therefore, based on the phrases uttered by the user in the agent, these are mapped that to a specific and discrete use case or unit of work, for e.g. check balance, transfer money and track spending are all "use cases" that the agent should support and be able to work out which unit of work should be triggered from the free text entry that the end user types in a natural language.

At a high level, there can typically be two types of requests: (1) A request to perform some action; and (2) a request for information, e.g., a question. A request has a response in which a unit of work is created. A question has a response that is, e.g., a good answer, to the question. In some aspects, the answer could take the form of the agent constructing an answer from its extensive knowledge base(s) or from matching the best existing answer from searching the internet or intranet or other publically or privately available data sources.

Discourse analysis, artificial intelligence, including machine learning, and natural language processing, have made great strides toward the long-term goal of passing the Turing test. With computers being more and more capable of searching and processing vast repositories of data and performing complex analysis on the data to include predictive analysis, the long-term goal is the agent being human-like and a computer combined. But such solutions fail to discriminate between questions and transactional requests.

To classify an utterance as a question or a request, certain aspects use linguistic analysis via parse trees and templates in conjunction with keyword analysis. Certain keywords such as imperative verbs can indicate that the utterance is a request for action. Similarly, whether an utterance includes certain combinations of words of particular types such as mental verbs or specific prefixes can be indicative of whether the sentence is a request for an action to be performed. Certain aspects supplement linguistic processing with machine learning, for example to further improve analysis or allow for customization.

An utterance can include a request that is formulated explicitly (e.g., "please turn up the heat" or implicitly (e.g., "it is cold."). Transactional requests can be disguised as questions, for example, a simple question "what is my account balance" may be a transactional request to select an account and execute a database query to determine the account balance. Further, a user may request a desired state rather than an explicit action to achieve the state. For example, utterance "I am too cold" indicates not a question but a desired state that can be achieved by turning on the heater. If no available action is associated with "cold" this utterance can be classified as a question related to "coldness." Aspects described herein can handle such a seemingly ambiguous phrase in a domain-independent manner by differentiating between questions and transactional requests linguistically.

As discussed, errors in recognizing questions versus transactional requests can be problematic. If an autonomous agent misinterprets a user question and returns an answer to a different question, the user can reformulate the question and ask again. If an autonomous agent recognizes a transactional request as an unintended transaction, the user will understand it when the agent issues a request to specify inappropriate parameters. Subsequently, the user might cancel her request and attempt to reformulate the request. But while agent errors associated with incorrectly understood questions and transactional requests can be rectified, agent errors in recognizing questions versus transactional requests would break the flow of the conversation and confuse the user on how to continue conversation, causing user frustration and perhaps rejection of the autonomous agent.

Additionally, discriminating between questions and transactional requests must be domain-independent (e.g., not dependent on the particular subject, such as banking, customer service, research, etc.). Certain aspects relieve an autonomous agent system developer of training a machine with domain-specific knowledge, at least for questions versus transactional requests. Moreover, certain aspects operate in a context-independent manner. For example, autonomous agents can handle switching back and forth between conversations related to questions and requests.

The following non-limiting example is provided to introduce certain aspects. An autonomous agent executing a classification application receives a message from a user that states "how do I check my balance?" The classification application accesses a set of classification data including predefined vocabulary and templates. The classification application performs linguistic processing on the utterance including parsing and semantic matching, applies a set of rules to the utterance, and to classifies the utterance as a question. In turn the autonomous agent provides a user device with information on how to check a bank balance.

Certain Definitions

As used herein, "utterance" is one or more words in any form such as verbally or written. Example utterances include "please turn on the lights" and "what's the weather?"

As used herein, "parse tree" or "syntax tree" refers to an ordered, rooted tree that represents the syntactic structure of text.

As used herein, "word type" refers to an attribute of a word. Examples include, verb, noun, noun phrase, preposition, etc.

As used herein, "prefix" refers to a word or part of a word that precedes all other words in a sentence. Examples include "please," "kindly," or "help."

As used herein, "suffix" refers to a word or part of a word that follows all other words in a sentence. Examples include "off" or "on."

Turning now to the Figures, FIG. 1 shows example of a text classification environment in accordance with an aspect. FIG. 1 depicts text classification environment 100, which includes user device 170, autonomous agent 101, and external device 180. User device 170 is configured to communicate with autonomous agent 101 via messages. In turn, autonomous agent 101 analyzes the user's messages to determine the user's intent, specifically whether a message indicates a question or a request. In response to user requests, can activate or reconfigure external device 180. Examples of external devices include lights, garage doors, music players, cars, etc.

User device 170 can be any mobile device such as a mobile phone, smart phone, tablet, laptop, smart watch, and the like. The functionality of user device 170 can be implemented in software, e.g., via an application or a web application. User device 170 includes display 171. Examples of display 171 include a computer screen, a mobile device screen, an LCD, or LED-backlit display, etc. Display 171 shows four messages 181-184.

Autonomous agent 101 includes one or more of classification application 102, classification data 120, linguistic engine 130, rule engine 140, classification model 150, or training data 160. Classification data 120 can include vocabularies, templates, and configuration components used by the linguistic engine 130 and rule engine 140. For example, classification data 120 includes a list of leading verbs that indicate that an utterance is a request. Examples include the verb "turn" as used in "turn on the lights" and "open" as in "open the garage door." Additionally, classification data 120 includes expressions present in utterances that indicate that the user desires something. Examples include phrases such as "Please do . . . for me" or phrases that indicate an information request such as "Give me my . . . ." These expressions also include different manners in which users might address questions, such as "please tell me . . . ". Further examples of data included in classification data 120 are explained with respect to FIG. 3.

Linguistic engine 130 performs one or more stages of linguistic analysis of an utterance. For example, linguistic engine 130 can detect a presence of a leading verb and a reference to an object in the possessive (e.g., "my house"). Linguistic engine 130 includes parser 131 and matcher 132. Matcher 132 can apply one or more templates to a parsed utterance to determine whether an utterance is a question or request. Examples of templates include string templates and linguistic templates. String templates detect the presence of a string in an utterance, whereas linguistic templates determine a presence of a match of a one or more specific types of words (e.g., noun, verb, pronoun).

Rule Engine 140 applies a sequence of keyword-based, vocabulary-based, and linguistic-based rules. The rules can be applied in a particular order. In an aspect, rule engine 140 attempts to identify requests in an utterance. If no requests are identified, rule engine 140 can fall back to a default decision and classify the utterance is a question. But rules that indicate a question are also possible. Classification application 102 receives a decision taken by rule engine 140 and outputs a classification.

In an example, user device 170 communicates with autonomous agent 101 to facilitate user questions and requests. Classification application 102 receives message 181 from user device 170. Message 181 is a user utterance that reads "Transfer funds from checking to savings." Continuing the example, classification application 102 determines a presence of a leading imperative verb "transfer" and determines that message 181 is a request. Autonomous agent 102 prompts the user to "please confirm the amount" by sending message 182 to user device 170. Subsequently, user device 170 sends a follow-on message 183 that reads "how do I check my balance?" to autonomous agent 101. In turn, classification application 102 determines the user's intent, specifically, a desire for information, and sends back message 184 aiding the user in checking his balance.

Additionally, certain aspects can use machine learning to automate the application of rules. For example, certain aspects use classification model 150 to obtain a classification of question versus request. Classification model 150 can be used instead of or addition to rule engine 140. Training data 160 contains training pairs that include text an expected classification (a question or a request). Classification application 102 can use training data 160 to train classification model 150. In addition to autonomous agents, practical applications for aspects described herein include mobile cloud implementations including autonomous mobile cloud enterprise.

Figure 2:
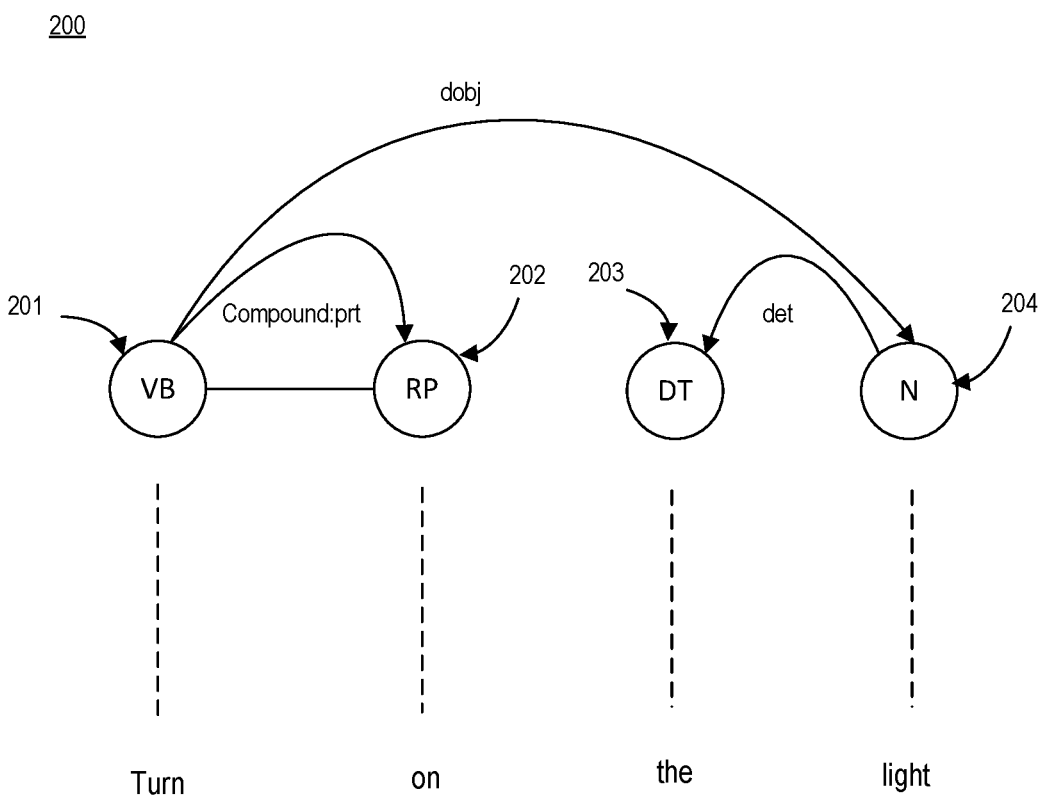
FIG. 2 depicts an example of a parse tree, in accordance with an aspect.

FIG. 2 depicts an example of a parse tree, in accordance with an aspect. FIG. 2 depicts parse tree 200, which parser 131 generates from the sentence "Turn on the light." Parse tree 200 includes nodes 201-204. Each node is indicated by a type, which can in turn be further refined by additional analysis. Table 1 describes examples of types, but others are possible.

TABLE 1

| Notation | Description |
| --- | --- |
| S | Sentence |
| NP | Noun Phrase |
| VP | Verb Phrase |
| V | Verb |
| D or DOBJ | determiner |
| N | Noun |
| RP | Phrasal verb particle |

As can be seen in FIG. 2, parser 131 determines verb phrase "turn" as depicted by node 201, phrasal verb article "on" at node 202, "the" at node 203 and "light" at node 204. They are linked with different relationships such as "dobj" and "det." Standard parsers can be used such as the Stanford NLP parser.

Classification application 102 can identify one or more keywords or match one or more linguistic templates with the utterance based on the position of particular expected words or types within the utterance. For example, node 202 refers to the word "Turn," which is in the first position within the utterance, i.e., the start. "On," node 203 is in the second position within the utterance, and so on. Node 204, or "lights" is in the final position, or at the end of the utterance.

Figure 3:
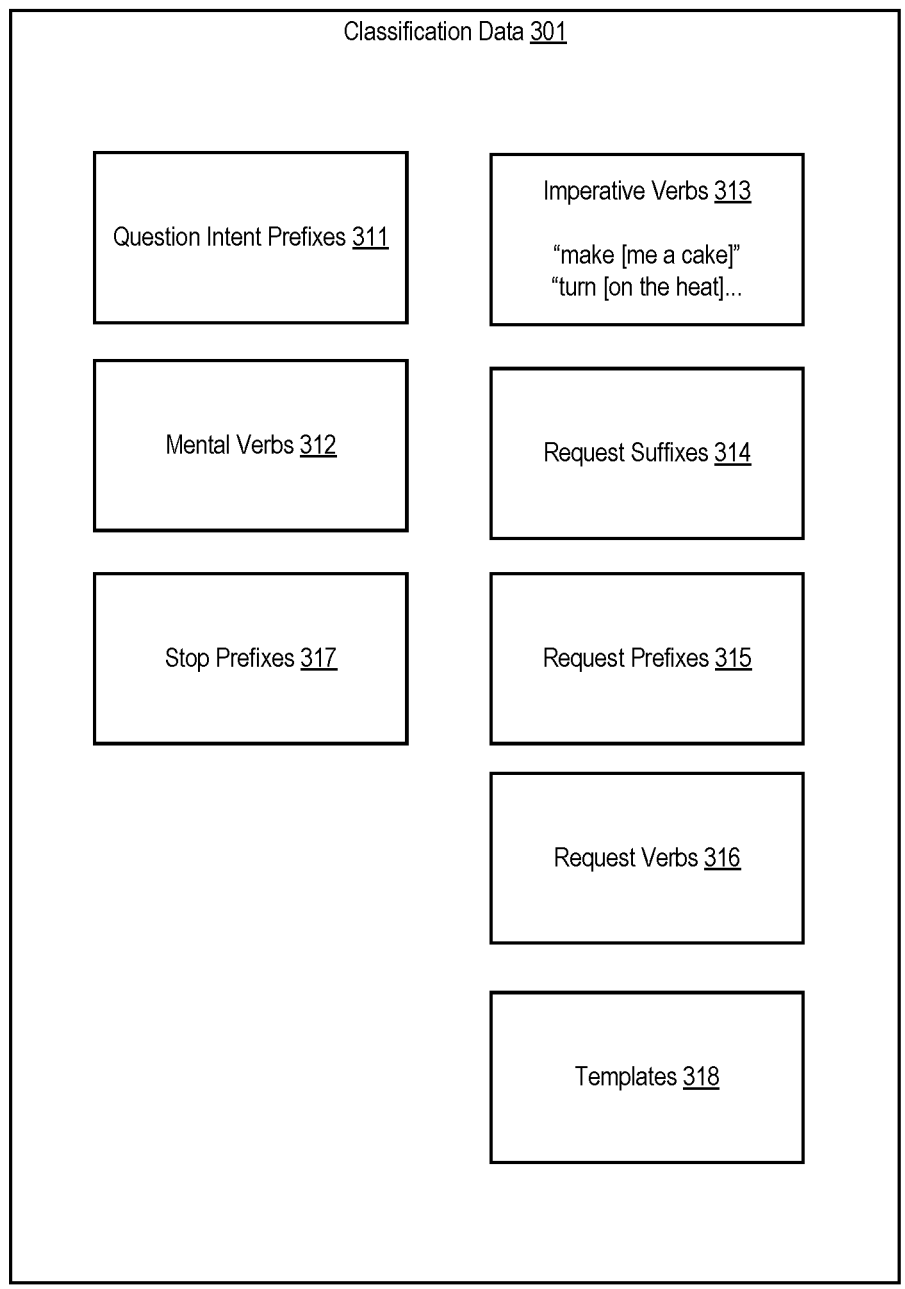
FIG. 3 depicts an example of a classification data used in a text classification environment, in accordance with an aspect.

FIG. 3 depicts an example of a classification data used in a text classification environment, in accordance with an aspect. Classification data 301 is an example of classification data 120 depicted in FIG. 1. Classification application 102 uses classification data 301 to assist with parsing, syntax matching, and linguistic processing. Classification data 301 includes question intent prefixes 311, mental verbs 312, imperative verbs 313, request suffixes 314, request prefixes 315, request verbs 316, stop prefixes 317 and templates 318. Other vocabulary words or words learned over time by classification application 102 are possible. Classification data 301 can be arranged in one or more arrays, lists, databases, or other data structures.

Classification application 102 identifies one or more vocabulary words or template matches in an utterance by using classification data 301. But each match outcome can be weighted by a set of rules, as further explained with respect to FIG. 4. As such, a particular match alone is not necessarily deterministic of a particular classification.

Question intent prefixes 311 include prefix words that help classification application 102 to identify a question within an utterance. For example, an utterance including "I want to know" includes intent prefix "I want." Examples of intent prefixes are shown in Table 2. Question intent prefixes 311 include misspellings and informal variants that may be expected with shorthand or Internet-based communications.

TABLE 2

| Question Intent Prefixes | |
| --- | --- |
| can you tell | can you explain |
| please tell | please inform |

TABLE 2-continued

| Question Intent Prefixes | |
| --- | --- |
| why | how to |
| how much can | how do i |
| do i | how can |
| what's the cause | whats the cause |
| what is the cause | what s the cause |
| what's the difference | whats the difference |
| what is the difference | what s the difference |
| what's the reason | whats the reason |
| what is the reason | what s the reason |
| how much money | show how |
| show me how | i need to know |
| i want to know | where can |

Classification application 102 can maintain a database of mental verbs 312. Mental verbs 312 includes verbs that relate to mental activities. Examples include "know," "think," "recognize," and so on. Mental verbs 312 can include variants of each verb in a different tense (e.g., know, knew, thought, etc.). Upon detecting a presence of one or more mental verbs 312, classification application 102 can classify utterance 310 as a question.

Using imperative verbs 313, matcher 132 can identify one or more imperative verbs 313 in an utterance. Imperative verbs 313 includes imperative verbs, verb phrases, and variants such as misspellings, verbs with incorrect punctuation, or different tenses of the same verb. Upon detecting a presence of one or more imperative verbs 313, classification application 102 can classify the utterance as a request. Table 3 illustrates some examples of imperative verbs and variants.

TABLE 3

| Example Imperative Verb Phrases and Variants | | |
| --- | --- | --- |
| do not | please do not | don't |
| please dont | "don t" | "please don t" |
| i want to | "i don t want to" | "i don't want to" |
| "i want you do" | i dont want you to", | i don t want u to |
| "can you | could you | can u |
| could u | what is my | where are my |
| when are my | i need | i want |
| it is | is it | what is the time |
| what day | what year | |

In an aspect, matcher 132 determines that the first word in an utterance is either a verb in the present tense, a verb in active voice, and neither modal, mental, or a form of the word "to be." Such constraints ensure, for example, that the verb is in the imperative form, e.g., "drop the temperature in the room."

In another aspect, linguistic engine 130 can also detect whether an utterance is related to an object the author of the utterance owns or is associated with. Examples include "my account balance" and "my car." By identifying these utterances, linguistic engine 130 can detect an intent to perform an action with the object(s) in the utterance or a request for information about the object(s) as compared to a question that expresses a request to share general knowledge not about the particular object(s).

In a further aspect, classification application 102 can determine additional verb variants. Verb variants include identifying additional verbs such as with prefixes "re," "dis," or "un." Examples include "re-load," "re-heat," "disassemble," and "unmake." In a further aspect, classification application 102 maintains a list of imperative verb prefixes "can you" as in "can you turn on the light." Classification application 102 can detect a presence of such prefixes and classify the utterance as a request.

To assist with determining whether an utterance is a request, classification application 102 can access request suffixes 314. Request suffixes 314 include adjectives that describe a state, such as a state of an object. Table 4 depicts examples of request suffixes.

TABLE 4

| Request Suffixes | |
|---|---|
| off | on |
| please | hot |
| cold | |

To assist with determining whether an utterance is a request, classification application 102 can access request prefixes 315. Request prefixes 315 include leading adjectives. Table 5 depicts examples of transaction suffixes.

TABLE 5

| Request Prefixes | |
|---|---|
| too | more |

Request verbs 316 include verbs that indicate a request or transaction. Examples of request verbs 316 also include "get," "set," bring," and "withdraw." Upon detecting one of request verbs 316 in the utterance, classification application 102 can classify the utterance as a request. Additionally, classification data 301 can include one or more verbs that do not indicate a request or a transaction. Examples include "burn" or "forget." Classification application 102 can ignore a presence of such words in the utterance. Table 6 depicts examples of verbs that indicate transactional requests and an absence of a transactional request.

TABLE 6

| Verbs indicating a transactional request | | | Verbs not indicating a transactional request |
|---|---|---|---|
| answer | get | consume | burn |
| approve | take | continue | bet |
| avoid | begin | adjust | dig |
| base | build | adopt | dream |
| block | break | check | drink |
| send | give | complain | feel |
| receive | carry | close | forgive |
| bill | classify | complete | forget |
| connect | clear | confine | hear |
| consider | consume | credit | hurt |
| continue | contribute | convert | mean |

Stop prefixes 317 include words or prefixes that a user might add to the beginning of an utterance such as "please." In an aspect, stop prefixes can be removed by classification application 102 as to not interfere with other processing. Table 7 illustrates examples of stop prefixes.

TABLE 7

| Stop Prefixes | |
|---|---|
| please | I |
| we | kindly |
| pls | |

Classification data 301 can include one or more templates 318. Matcher 132 can also apply one or more linguistic templates to an utterance. Templates 318 can include syntax-based templates or linguistic templates. An example syntax-based template is whether an utterance contains "how to" or "if."

Figure 4:
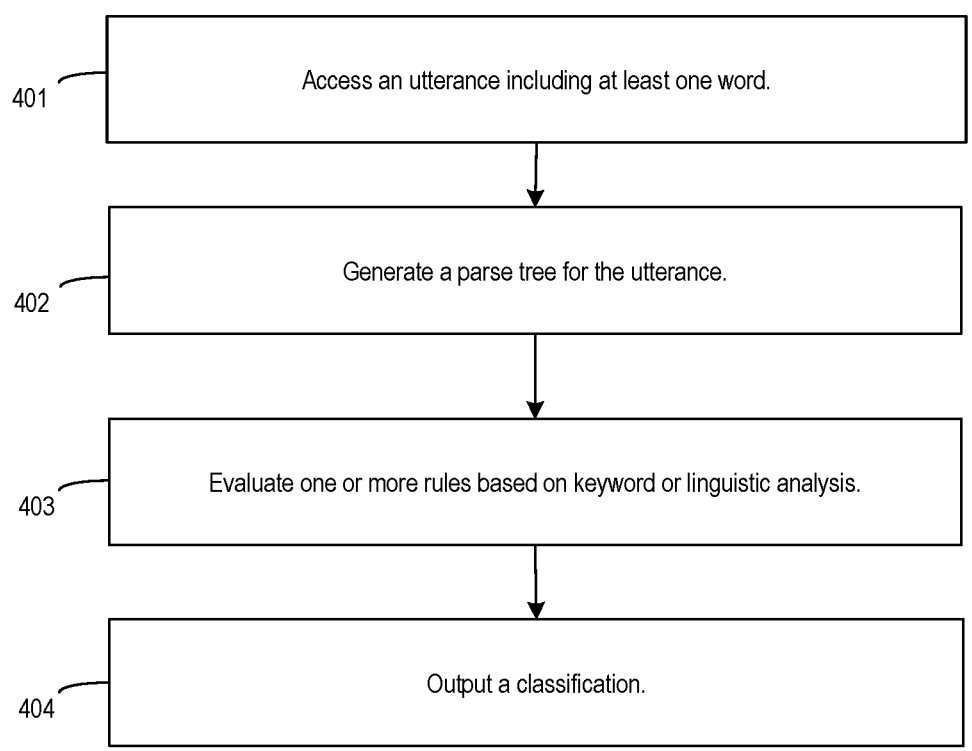
FIG. 4 depicts a flowchart illustrating an example of a process for discriminating between a question and a request, in accordance with an aspect.

FIG. 4 depicts a flowchart illustrating an example of a process for discriminating between a question and a request, in accordance with an aspect.

At block 401, process 400 involves accessing an utterance including a word.

Examples of utterances include short phrases such as "stop," longer phrases such as "turn off the heat," or "how do I check my portfolio?" Classification application 102 can access an utterance from a process or application executing on computing device 101 or from another computing device such as a user device.

In an aspect, classification application 102 preprocesses utterance 101 to remove stop prefixes 317. Removing stop prefixes 317 can prevent errors including ignoring words that are in a second or subsequent position in the utterance but indicate a particular classification.

At block 402, process 400 involves generating a parse tree for the utterance. Classification application 102 uses parser 131 to generate a parse tree in a substantially similar manner as described with respect to FIG. 2.

At block 403, process 400 involves evaluating one or more rules based on keyword or linguistic analysis. Classification application 102 can use the parse tree or the utterance (i.e., text) as input to any of the rules.

Figure 5:
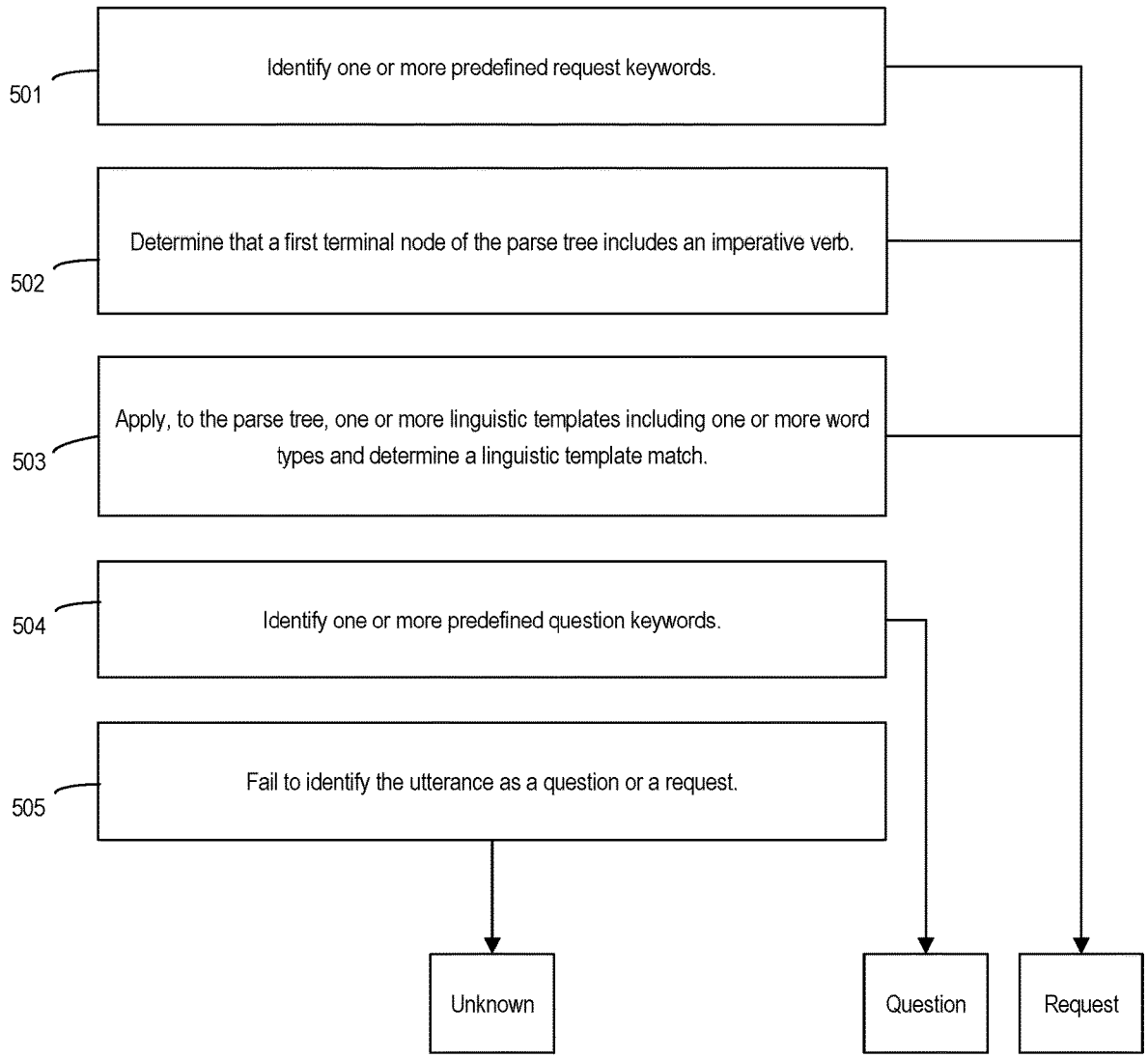
FIG. 5 depicts a flowchart illustrating examples of rules used for discriminating between a question and a request, in accordance with an aspect.

FIG. 5 depicts a flowchart illustrating examples of rules used for discriminating between a question and a request, in accordance with an aspect. Classification application 102, specifically rule engine 140 can execute one or more of blocks 501-505 individually, in combination, and in any order. Different priority orders are possible. For example, if rule engine 140 determines that block 501 has successfully executed, then rule engine 140 can output a classification of "request," and return to block 404. In another example, if rule engine 140 executes block 502, but does not identify any request keywords, then rule engine 140 can continue to one of blocks 502-505.

At block 501, process 500 involves identifying one or more predefined request keywords. Predefined request keywords can include request suffixes 314, request prefixes 315, and request verbs 316. A presence of one or more of these keywords indicates a request. Table 8 depicts sentences identified as transactions and illustrates the analysis performed in each case.

TABLE 8

| Sentence | Analysis |
|---|---|
| Turn the light on | request suffix "on" |
| Put wiper rate on high | request suffix "high" |
| set the security system to off | request suffix "off" |
| too loud, quieter please | request prefix "too" |

More specifically, each type of request keyword can have an associated position in which the keyword is expected. For example, classification application 102 searches for a request prefix in the first word position of the utterance, request suffixes in the last word position in the utterance, and request verbs at any position in the utterance.

At block 502, process 500 involves determining that a first terminal node of the parse tree includes an imperative verb. Matcher 132 receives a parse tree representing the utterance from parser 131 and identifies an imperative verb from imperative verbs 313. If a leading imperative verb, or a verb in the first word position of the utterance, is identified, then classification application 102 can output a classification of "request," and processes 500 and 400 can terminate. Table 9 depicts examples of utterances identified as requests based on a presence of imperative verb.

TABLE 9

| Sentence | Imperative Verb |
| --- | --- |
| Open iWish-a Flexible Recurring Deposit | open |
| Cancel a Fixed Deposit using ICICI Bank VISA Debit Card | cancel |
| Help me to Login and raise a Service Request | help |
| Transfer funds from checking to saving | transfer |
| Move funds from saving to mortgage | move |
| close the garage door | close |
| do western union | do |

In an aspect, classification application 102 can weigh different factors. For example, in the case that classification application 102 detects a presence of a leading verb, indicating a request, the presence of "how" in the utterance, can negate a presence of a leading verb and indicate a question. In that case, classification application 102 classifies the utterance as a question.

Additionally, classification application 102 can additionally detect the presence of a first-person pronoun such as "me" or "my." More specifically, in a case in which a leading verb is a mental verb, typically indicating a question, the presence of "me" or "my" can nevertheless indicate a request. Therefore, in the case of a mental verb in conjunction with "me" or "my," classification application 102 classifies the utterance as a request. Table 10 depicts examples of utterances identified with these rules.

TABLE 10

| Sentence | Analysis |
| --- | --- |
| give me cheque deposited in Bank Account but not credited | [leading imperative verb + me] leading verb identified "give," and a presence of "me" identified. Classified as request. |
| Fund my investment account from checking | Leading verb identified "fund" and "my" identified in an absence of "how." Classified as request. |
| Wire money from my checking to investment | Leading verb identified "fund" and "my" identified in an absence of "how." Classified as request. |
| Thinking about checking accounts. | Leading mental verb. Classified as question. |
| Thinking about my checking account. | Leading mental verb "thinking" in combination with "my." Classified as a request. |

If no leading imperative verb match is found, then process 500 can continue to one or more of block 501, or 503-505 for further evaluation.

At block 503, process 500 involves applying, to the parse tree, one or more linguistic templates and determining a linguistic template match. The linguistic template can include one or more word types (e.g., verb). More specifically, matcher 132 determines a match by determining that the one or more word types are present in the parse tree. An example of a template is a presence of a pronoun followed by a noun (represented by PR+NN). A match of this template can indicate a request. For example, "give me my balance" or "get me my balance," where the pronoun is "my" and the noun is "balance." Conversely, matcher 132 does not categorize the utterance "tell me how to check an account balance" as a transaction due to the absence of the pronoun.

At block 504, process 500 involves identifying one or more predefined question keywords. Examples of question keywords include question intent prefixes 311, and mental verbs 312. A presence of one or more of these keywords indicates that the utterance is a question. Table 11 depicts examples of sentences in which one or more question keywords are identified by classification application 102.

TABLE 11

| Sentence | Analysis |
| --- | --- |
| I am anxious about spending my money | [mental verb] |
| I am worried about my spending | [mental verb] |
| I am concerned about how much I used | [mental verb] |
| I am interested how much money I lost on stock | [mental verb] |
| How can my saving account be funded | [How + my] |
| If I do not have my Internet Banking User ID and Password, how can I login? | [if and "how can I" - prefix] |

In some cases, classification application 102 can default to a particular classification if the rules for other classifications are not applied. For example, if no requests are identified in the utterance "domestic wire transfer," then classification application 102 identifies the utterance as a question. Table 12 identifies additional cases.

TABLE 12

| Sentence | Analysis |
| --- | --- |
| Domestic wire transfer | [no transactional rule fired therefore question] |
| order replacement/renewal card not received | [no transactional rule fired therefore question] |

At block 503, process 500 involves failing to identify the utterance as a question or a request. If no rule successfully identifies the utterance as a question or request, then autonomous agent 101 can ask the user for further clarification.

Returning to FIG. 4, process 400 involves outputting the classification. An autonomous agent can receive the classification and take action accordingly. Based on an identified classification, autonomous agent 101 can take some action such as further interaction with user device 170 or reconfiguring, activating, or deactivating external device 180.

As discussed, certain aspects can use machine learning to classify text. An example classification model is classification model 150, which can use different models such as classifiers, Tree Kernels, or Support Vector Machine, or SVM TK. Training data can be obtained from various sources. Training data can be application-specific. For example, a financial institution using certain aspects may wish to provide a list of acceptable bank transactions (e.g., checking balance, transferring funds) so that classification application 102 is trained with appropriate content.

Figure 6:
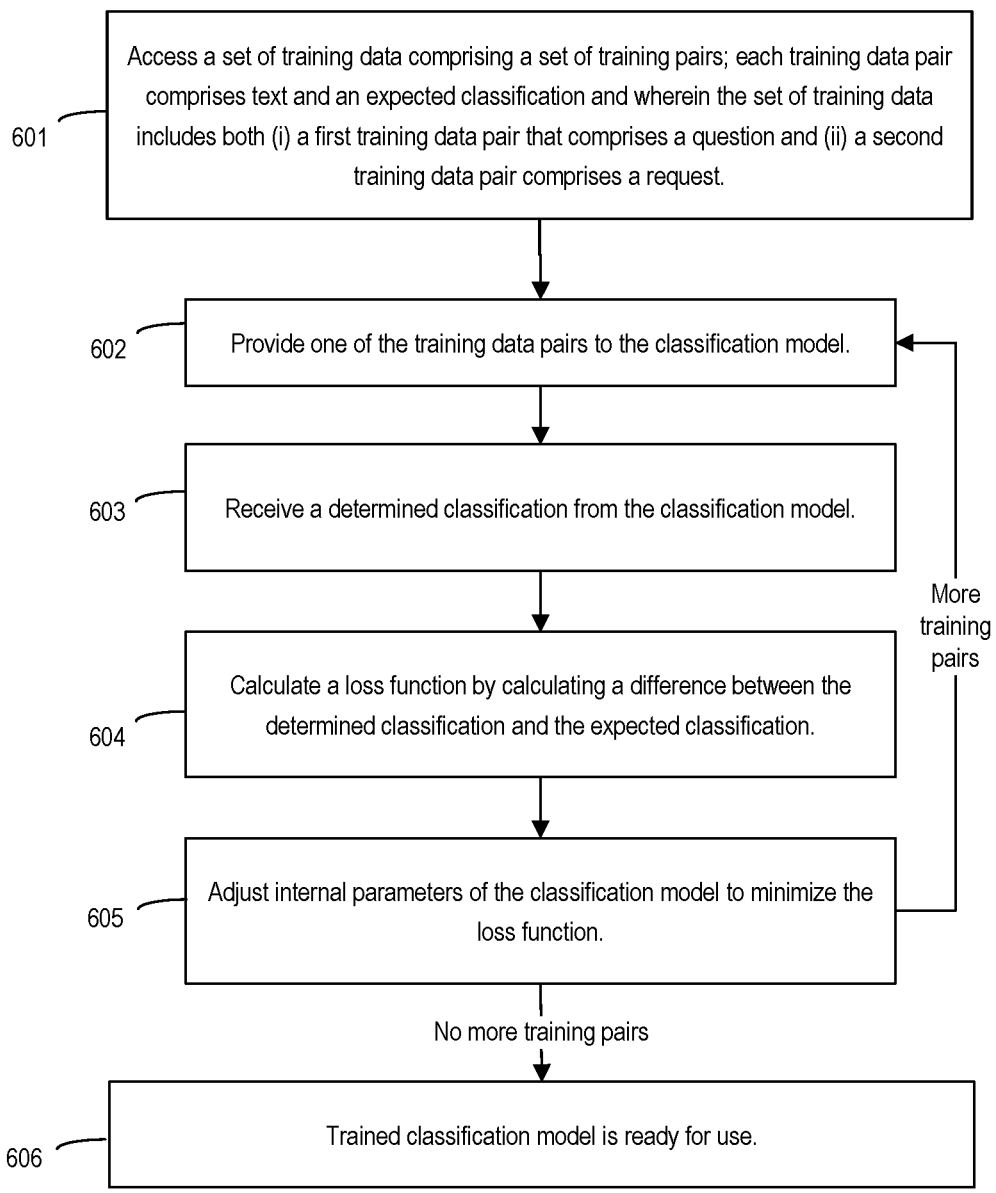
FIG. 6 depicts a flowchart of an exemplary process for training a machine learning model to detect whether an utterance is a question or a request, in accordance with an aspect.

FIG. 6 depicts a flowchart illustrating an example of a process for training a classification model to determine informative text for indexing, in accordance with an aspect. As further described in process 600, classification model 150 can be trained to discriminate between questions and requests. Training data 160 can include two training sets, such as a training set with text identified as requests and a second training set with text identified as questions. Training data 160 can include text and/or associated parse trees.

At block 601, process 600 involves accessing a set of training data comprising a set of training pairs. Each training data pair comprises text and an expected classification (e.g., question or request). The set of training data can include both a first training data pair that comprises a question and a second training data pair comprises a request.

At block 602, process 600 involves providing one of the training data pairs to the classification model. Accordingly, the classification model receives a body of text and an expected classification.

At block 603, process 600 involves receiving a determined classification from the classification model.

At block 604, process 600 involves calculating a loss function by calculating a difference between the determined classification and the expected classification. Different loss functions are possible such as mean-square error, likelihood loss, log (or cross entropy) loss, etc.

At block 605, process 600 involves adjusting internal parameters of the classification model to minimize the loss function. In this manner, the classification model learns to improve the accuracy of its predictions with each iteration of training.

At block 606, process 600 involves using the trained classification model. For example, the trained classification model can be used in processes 400 or 500 in conjunction with or instead of the various classification rules.

For example, to use the trained classification model 150, classification application 102 can access an utterance of text and generate a parse tree for the utterance. Classification application 102 determines a classification of the utterance by applying classification model 150 to the parse tree.

In turn, classification application 102 uses one of several methods to determine a classification. For example, classification model 150 determines a first similarity score indicating a first match between the utterance and training classes identified as questions and a second similarity score indicating a second match between the utterance and training classes identified as requests.

Classification model 150 outputs a classification based on the first similarity score and the second similarity score. For example, if the first similarity score is higher than the second similarity score, then classification model 150 outputs a classification of "question." If the second similarity score is higher than the first similarity score, then classification model 150 outputs a classification of "request." In some cases, for example, if an error occurs, then classification model 150 can output a classification of "unknown."

Customization of Classification Criteria

A developer or vendor of an autonomous agent may overwrite the default training set or rules (i.e., questions vs transactional requests) by providing a training set which includes samples for both classes. Re-training of classification model 150 can occur prior to use or at runtime. For example, upon receiving a new utterance, classification application 102 can perform the following process:

(1) create an instant index the current utterance;

(2) iterate through all samples from both classes, building a query and issuing a search against the instant index;

(3) collect the set of queries which delivered non-empty search results with its class and aggregate this set by the classes; and (4) after verifying that a certain class is highly represented by the aggregated results and the other class has significantly lower presentation, selecting the highly represented class as a recognition result.

Lucene default TF*IDF model will assure that the training set elements closest in terms of most significant keywords (from the frequency perspective (Tan 2005, Salton and Yang 1973)). (Trstenjak et al 3014) presents the possibility of using a nearest neighbor (KNN) algorithm with TF*IDF method for text classification. This method enables classification according to various parameters, measurement and analysis of results. Evaluation of framework was focused on the speed and quality of classification, and testing results showed positive and negative characteristics of TF*IDF-KNN algorithm. Evaluation was performed on several categories of documents in online environment and showed stable and reliable performance. Tests shed the light on the quality of classification and determined which factors have an impact on performance of classification.

Example Software Code

Example code that implements functionality of classification application 102 is shown below.

```
// returns null if meaningless utterance, or unable to recognize
// returns true if TRANSACTIONAL, false if QUESTION.
// explanationMap stores <decisions, with explanations>
public Boolean isARequestUtteranceKeywordBased(String utteranceOrig, Map<String, Object> explanationMap) {
        String utterance = utteranceOrig.toLowerCase( );
Boolean matchedWithTrainingSet =
lingRecognizer.matchWithTrainingSet(utteranceOrig);
        if (matchedWithTrainingSet != null) {
            explanationMap.put("ling_match_recognizer", true);
            explanationMap.putAll(lingRecognizer.getExplanationMap( ));
            return matchedWithTrainingSet;
        }
        List<String> tokens = TextProcessor.fastTokenize(utterance, false);
        if (tokens.size( ) < 2) {
            explanationMap.put("analysis is rejected", "single token utterance");
            return null;
        }
        // remove stop – pre – word
        if     (tokens. get(0).equals("please")     ||     tokens.get(0).equals("i")     ||
tokens.get(0).equals("we"))
            tokens.remove(0);
```

```
            // remove stop-phrase
            try {
                if (tokens.get(0).equals("this") && (tokens.size( ) > 2 && tokens.get(1).equals("is")) ||
(tokens.size( ) > 2 && tokens.get(2).equals("a"))) {
                    tokens.remove(0);
                    tokens.remove(1);
                    tokens.remove(2);
                }
            } catch (Exception e) {
            }
            // check verb + verb prefixes lookup, in case parsing will not find verbs properly
            if (requestVerbsCached.contains(tokens.get(0))) {
                explanationMap.put("check verb + verb prefixes lookup, in case parsing will not find
verbs properly. Found leading verb: ", tokens.get(0));
                explanationMap.put("reduced sentence for analysis", tokens.toString( ));
                return true;
            }
            // check if the first word is an (imperative) verb
            if (lingRecognizer.isARequestUtteranceKeywordBased(utteranceOrig)) {
                explanationMap.put("ling_recognizer", true);
                explanationMap.put("why transactional", "leading verb");
                explanationMap.putAll(lingRecognizer.getExplanationMap( ));
                return true;
            }
            // prefix + verb for request
            for (String prefix : requestVerbsPrefix) {
                if (utterance.startsWith(prefix)) {
                    String utteranceRemainder = utterance.replace(prefix, "");
                    List<String> tokensRemainder = TextProcessor.fastTokenize(utteranceRemainder,
false);
                    if (tokensRemainder.isEmpty( )) {
                        explanationMap.put("why transactional", "leading verb");
                        explanationMap.put("all non-verbs are removed", "remained empty");
                        return true;
                    }
                    if (requestVerbsCached.contains(tokensRemainder.get(0))) {
                        explanationMap.put("why transactional", "leading verb");
                        explanationMap.put("leading verb", tokensRemainder.get(0));
                        return true;
                    }
                }
            }
            // prefix for non-request
            for (String prefix : faqVerbsPrefix) {
                if (utterance.startsWith(prefix)) {
                    explanationMap.put("whyQnA", "QnA prefix");
                    explanationMap.put("QnA prefix", prefix);
                    return false;
                }
            }
            // prefix + verb for request
            for (String prefix : requestVerbsPrefix) {
                if (utterance.startsWith(prefix)) {
                    explanationMap.put("why transactional", "transactional prefix");
                    explanationMap.put("transactional prefix", prefix);
                    return true;
                }
            }
            for (String suffix : this.requestWordSuffix) {
                if (utterance.endsWith(suffix)) {
                    explanationMap.put("why transactional", "transactional suffix");
                    explanationMap.put("transactional suffix", suffix);
                    return true;
                }
            }
            explanationMap.put("neither QnA nor Transactional rule fired", "");
            return null;
        }
//This is used for classifying an utterance by machine learning
// returns true if TRANSACTIONAL, false if QUESTION.
// explanationMap stores <decisions, with explanations>
public Boolean matchWithTrainingSet(String utterance) {
                    int count = 0, bestScoreIndex = -1;
                    double bestScore = 0;
                    Boolean bestDecision = null;
```

```
            for (String[ ] line : nearestNeighborTrainingSet) {
                    List<List<ParseTreeChunk>> res = matcher.assessRelevanceCache(utterance,
line[0]);
                    double            syntacticScore            =
parseTreeChunkListScorer.getParseTreeChunkListScoreAggregPhraseType(res);
                    if    (syntacticScore    >   bestScore   &&   syntacticScore   >
MIN_SCORE_TO_MATCH) {
                        bestScore = syntacticScore;
                        try {
                            bestDecision = Boolean.parseBoolean(line[1]);
                        } catch (Exception e) {
                            e.printStackTrace( );
                        }
                        bestScoreIndex = count;
                    }
                    count++;
            }
            explanationMap.put("found decision via matching phrase", bestDecision);
            if (!nearestNeighborTrainingSet.isEmpty( ))
                    explanationMap.put("found           matching            phrase",
nearestNeighborTrainingSet.get(bestScoreIndex)[0]);
            return bestDecision;
      }
```

Figure 7:
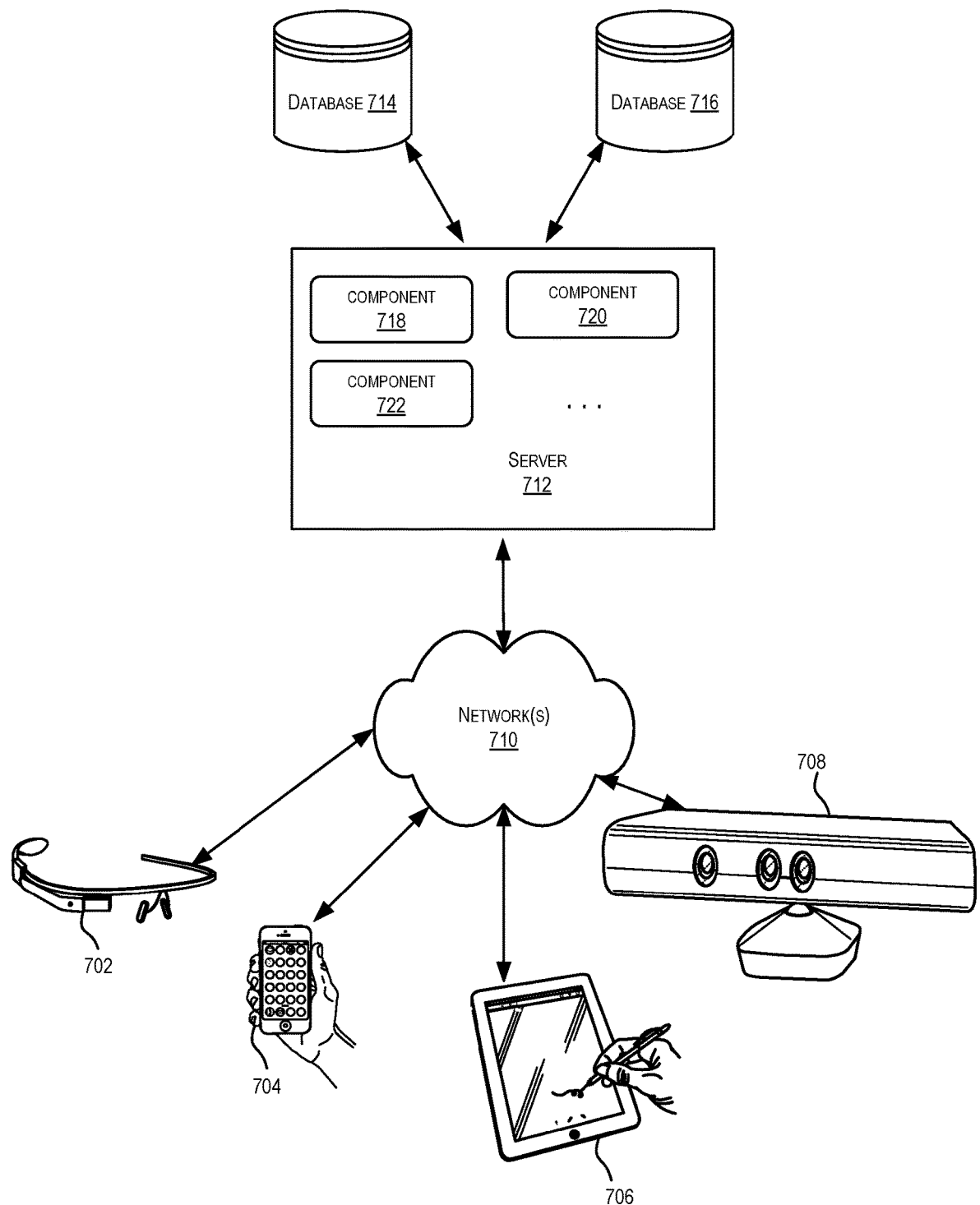
FIG. 7 depicts a simplified diagram of a distributed system for implementing one of the aspects.

FIG. 7 depicts a simplified diagram of a distributed system 700 for implementing one of the aspects. In the illustrated aspect, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various aspects, server 712 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of distributed system 700 are shown as being implemented on server 712. In other aspects, one or more of the components of distributed system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The aspect shown in the figure is thus one example of a distributed system for implementing an aspect system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.7 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various aspects, server 712 may be adapted to run one or more services or software applications described in the foregoing disclosure. For example, server 712 may correspond to a server for performing processing described above according to an aspect of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of aspects, databases 714 and 716 may reside in a storage-area network (SAN). Similarly, any necessary files for performing the functions attributed to server 712 may be stored locally on server 712 and/or remotely, as appropriate. In one set of aspects, databases 714 and 716 may include relational databases, such as databases provided by Oracle, that are adapted to store, update, and retrieve data in response to SQL-formatted commands.

Figure 8:
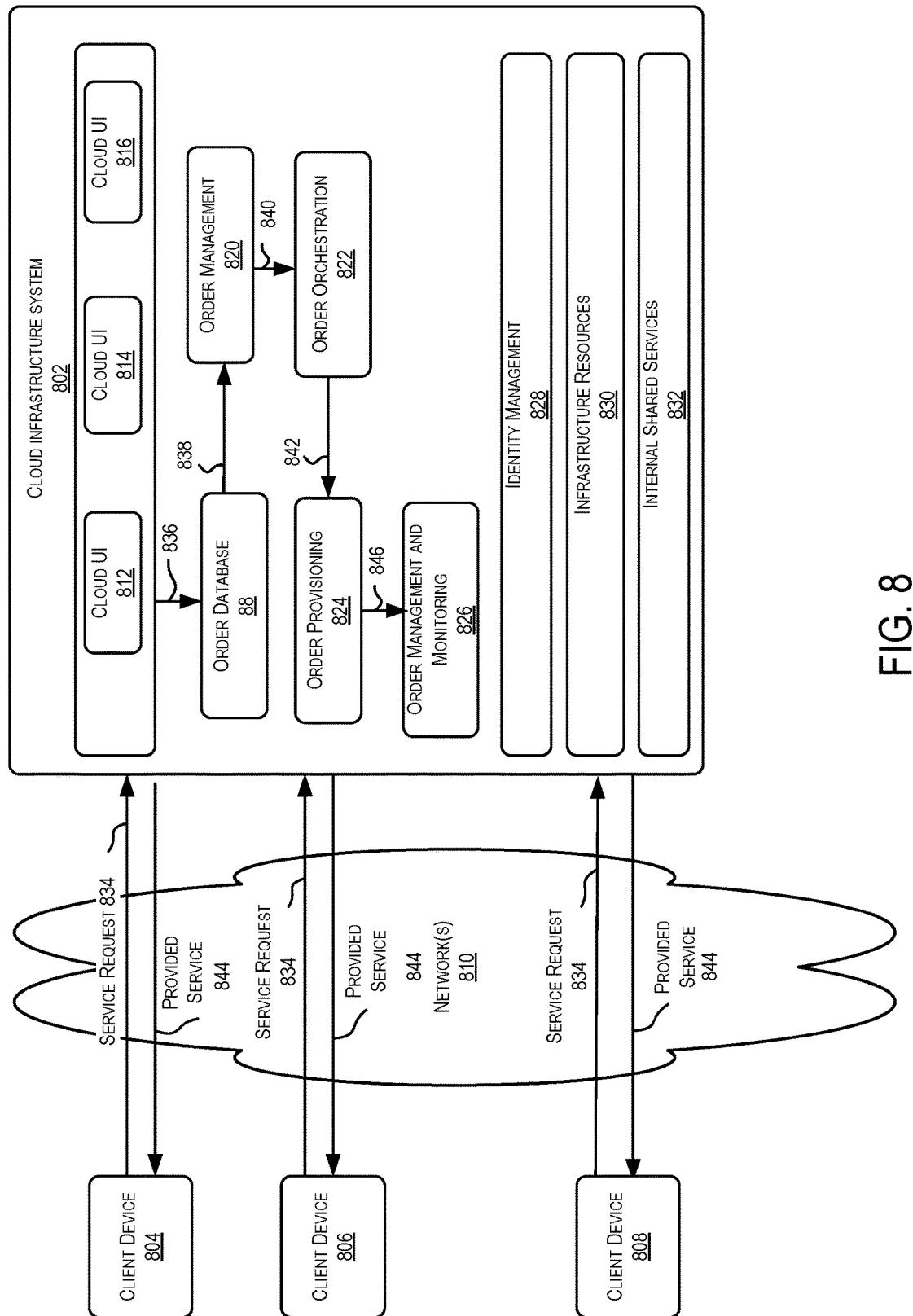
FIG. 8 is a simplified block diagram of components of a system environment by which services provided by the components of an aspect system may be offered as cloud services in accordance with an aspect.

FIG. 8 is a simplified block diagram of one or more components of a system environment 800 by which services provided by one or more components of an aspect system may be offered as cloud services in accordance with an aspect of the present disclosure. In the illustrated aspect, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the aspect shown in the figure is only one example of a cloud infrastructure system that may incorporate an aspect of the invention. In some other aspects, cloud infrastructure system 802 may have more or fewer components than shown in the figure, may combine two or more components, or may have a different configuration or arrangement of components.

Client computing devices 804, 806, and 808 may be devices similar to those described above for 2802, 2804, 2806, and 2808.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 810.

Cloud infrastructure system 802 may comprise one or more computers and/or servers that may include those described above for server 812.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some aspects, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some aspects, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 802 may also include infrastructure resources 830 for providing the resources used to provide various services to customers of the cloud infrastructure system. In one aspect, infrastructure resources 830 may include pre-integrated and optimized combinations of hardware, such as servers, storage, and networking resources to execute the services provided by the PaaS platform and the SaaS platform.

In some aspects, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 802 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 802, and the like.

In one aspect, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain aspects, the customer may access a cloud User Interface (UI), cloud UI 88, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 88, 814 and/or 816.

At operation 836, the order is stored in order database 88. Order database 88 can be one of several databases operated by cloud infrastructure system 88 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain aspects, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain aspects, cloud infrastructure system 800 may include an identity management module 828. Identity management module 828 may be configured to provide identity services, such as access management and authorization services in cloud infrastructure system 800. In some aspects, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
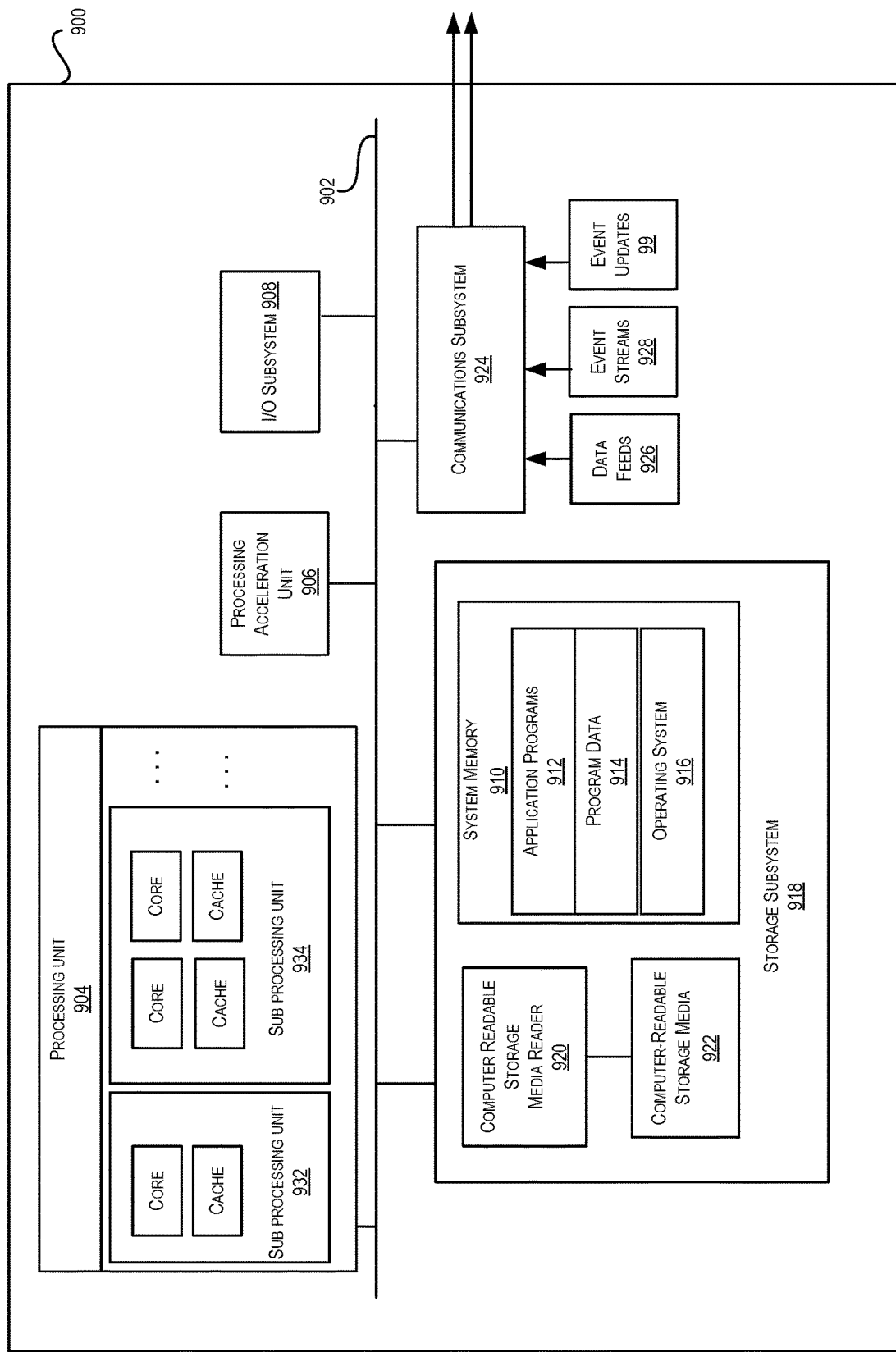
FIG. 9 illustrates an exemplary computer system, in which various aspects of the present invention may be implemented.

FIG. 9 illustrates an exemplary computer system 900, in which various aspects of the present invention may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative aspects of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P986.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain aspects, processing unit 904 may be implemented as one or more independent processing units 932 and/or 934 with single or multicore processors included in each processing unit. In other aspects, processing unit 904 may also be implemented as a quad-core processing unit formed by integrating two dual-core processors into a single chip.

In various aspects, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some aspects. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some aspects, communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 924 can provide wired network connectivity (e.g., Ethernet) in addition to or instead of a wireless interface.

In some aspects, communications subsystem 924 may also receive input communication in the form of structured and/or unstructured data feeds 926, event streams 928, event updates 99, and the like on behalf of one or more users who may use computer system 900.

By way of example, communications subsystem 924 may be configured to receive unstructured data feeds 926 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 99, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 99, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A system for classifying text as a question or a request, comprising:
 a linguistic engine configured to:
  access an utterance comprising at least one word;
  generate a parse tree for the utterance, wherein the parse tree comprises at least one terminal node comprising a word type, wherein each terminal node represents a word or phrase of the utterance and wherein the parse tree identifies syntactic information of the utterance; and apply, to the parse tree, one or more linguistic templates comprising one or more word types; and a rule engine configured to generate one or more match results obtained from the linguistic engine and determine a classification of the text by applying rules comprising:
(i) responsive to determining, from the parse tree, that the utterance comprises a first person pronoun followed by a noun, classifying the utterance as a request;
(ii) responsive to determining, from the parse tree, that the utterance comprises an imperative verb as a first word of the utterance by identifying a verb that is (a) in a present tense or in an active voice and (b) neither modal, mental, or a form of the verb "to be," classifying the utterance as a request;
(iii) responsive to identifying, in the utterance, one or more predefined request keywords, classifying the utterance as a request;
(iv) responsive to identifying, in the utterance, a mental verb, classifying the utterance as a question; and
(v) responsive to determining that the utterance comprises a question intent prefix in a first word position, classifying the utterance as a question,
wherein the system is further configured, based on the classification as the question or the request, to send a message to a user device or adjust a configuration of an external device.

2. The system of claim 1, wherein the rules further comprise (vi) responsive to failing to identify the utterance as a question or a request, classifying the utterance as unknown.

3. The system of claim 1, wherein the rules further comprise (vi) responsive to determining that the utterance comprises a request suffix at in a last word position of the utterance, classifying the utterance as a request.

4. The system of claim 1, wherein the rules further comprise (vi) responsive to determining that the utterance comprises a transaction verb, classifying the utterance as a request.

5. The system of claim 1, wherein the linguistic engine is configured to, prior to determining the parse tree, removing one or more stop words from the utterance.

6. A method of using a classification model to classify utterances as questions or requests, the method comprising:
accessing an utterance, wherein the utterance comprises words;
generating a parse tree for the utterance, wherein the parse tree comprises at least one terminal node comprising a word type representing a word or phrase of the utterance, and wherein the parse tree identifies syntactic information of the utterance;
applying, to the parse tree, a classification model, that is trained to apply rules comprising:
(i) responsive to determining, from the parse tree, that the utterance comprises a first person pronoun followed by a noun, classifying the utterance as a request;
(ii) responsive to determining, from the parse tree, that the utterance comprises an imperative verb as a first word of the utterance by identifying a verb that is (a) in a present tense or in an active voice and (b) neither modal, mental, or a form of the verb "to be," classifying the utterance as a request;
(iii) responsive to identifying, in the utterance, one or more predefined request keywords, classifying the utterance as a request;
(iv) responsive to identifying, in the utterance, a mental verb, classifying the utterance as a question; and
(v) responsive to determining that the utterance comprises a question intent prefix in a first word position, classifying the utterance as a question; and
receiving, from the classification model, a classification of the utterance, wherein the classification of the utterance identifies the utterance as (i) a question, (ii) a request, or (iii) unknown.

7. The method of claim 6, further comprising:
accessing a set of training data comprising a set of training data pairs, wherein each training data pair comprises text and an expected classification, and wherein the set of training data includes both (i) a first training data pair that comprises a question and (ii) a second training data pair comprises a request; and
training the classification model by iteratively:
providing one of the training data pairs to the classification model;
receiving, from the classification model, a determined classification;
calculating a loss function by calculating a difference between the
determined classification and the expected classification; and
adjusting internal parameters of the classification model to minimize the loss function.

8. A method for classifying text as a question or a request, the method comprising:
accessing an utterance comprising at least one word;
generating a parse tree for the utterance, wherein the parse tree comprises at least one terminal node comprising a word type, wherein each terminal node represents a word or phrase of the utterance and wherein the parse tree identifies syntactic information of the utterance; and
applying, to the parse tree, one or more linguistic templates comprising one or more word types; and
applying rules comprising:
(i) responsive to determining, from the parse tree, that the utterance comprises a first person pronoun followed by a noun, classifying the utterance as a request;
(ii) responsive to determining, from the parse tree, that the utterance comprises an imperative verb as a first word of the utterance, classifying the utterance as a request;
(iii) responsive to identifying, in the utterance, one or more predefined request keywords, classifying the utterance as a request;
(iv) responsive to identifying, in the utterance, a mental verb, classifying the utterance as a question;
(v) responsive to determining that the utterance comprises a question intent prefix in a first word position, classifying the utterance as a question; and
(vi) responsive to determining, from the parse tree, that the utterance comprises a first person pronoun and a mental verb, classifying the utterance as a request; and
sending, based on the classification as the question or the request, a message to a user device or adjust a configuration of an external device.

9. The method of claim 8, wherein the rules further comprise:

(vii) responsive to determining, a linguistic template match, classifying the utterance as a request.

10. The method of claim 8, wherein the rules further comprise (vii) responsive to failing to classify the utterance as the question or the request, classifying the utterance as unknown.

11. The method of claim 8, wherein the rules further comprise (vii) responsive to identifying, in the utterance, a transaction suffix or a transaction verb, classifying the utterance as a request.

12. The method of claim 8, wherein the rules further comprise (vii) responsive to determining that the utterance comprises a question prefix, classifying the utterance as a question.

13. The method of claim 8 further comprising removing one or more stop words from the utterance.

14. The method of claim 9, wherein the classification model is a tree kernel or a support vector machine.

15. The system of claim 1, wherein the rules further comprise (vi) responsive to determining, from the parse tree, that the utterance comprises a first person pronoun and a mental verb, classifying the utterance as a request.

16. The method of claim 8, wherein determining that the utterance comprises an imperative verb comprises determining that the utterance comprises a verb that is (a) in a present tense or in an active voice and (b) neither modal, mental or a form of the verb "to be."

17. The system of claim 1, wherein the rule engine is implemented by a classification model.

18. The method of claim 8, wherein applying the rules comprises inputting the parse tree to a classification model.

* * * * *

UNITED STATES PATENT AND TRADEMARK OFFICE
CERTIFICATE OF CORRECTION

PATENT NO. : 10,796,099 B2  
APPLICATION NO. : 16/145702  
DATED : October 6, 2020  
INVENTOR(S) : Galitsky et al.

Page 1 of 1

It is certified that error appears in the above-identified patent and that said Letters Patent is hereby corrected as shown below:

On the Title Page

On page 2, Column 1, Item (56) under Other Publications, Line 11, delete "accessable" and insert -- accessible --, therefor.

On page 2, Column 1, Item (56) under Other Publications, Line 15, delete "accessable" and insert -- accessible --, therefor.

On page 2, Column 2, Item (56) under Other Publications, Line 5, delete "Discreet" and insert -- Discrete --, therefor.

In the Drawings

On sheet 1 of 9, in FIG. 1, under Reference Numeral 101, Line 1, delete "Autonomus" and insert -- Autonomous --, therefor.

In the Specification

In Column 3, Line 58, delete "that that" and insert -- that --, therefor.

In Column 10, Lines 12-17, delete "Examples of utterances include short phrases such as "stop," longer phrases such as "turn off the heat," or "how do I check my portfolio?" Classification application 102 can access an utterance from a process or application executing on computing device 101 or from another computing device such as a user device." and insert the same on Column 10, Line 11, as a continuation of the same paragraph.

In the Claims

In Column 31, Line 17, in Claim 14, delete "claim 9," and insert -- claim 6, --, therefor.

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*